United States Patent [19]

Witiak

[11] 4,435,539
[45] Mar. 6, 1984

[54] STABILIZED POLYMER COMPOSITIONS

[75] Inventor: David Witiak, Yardley, Pa.

[73] Assignee: Rohm and Haas Company, Philadelphia, Pa.

[21] Appl. No.: 403,240

[22] Filed: Jul. 29, 1982

Related U.S. Application Data

[63] Continuation of Ser. No. 218,909, Dec. 22, 1980, abandoned.

[51] Int. Cl.³ .............................................. C08L 33/00
[52] U.S. Cl. ..................................... 524/558; 526/317
[58] Field of Search ................. 526/320, 317; 524/558

[56] References Cited

U.S. PATENT DOCUMENTS

| | | | |
|---|---|---|---|
| 3,208,963 | 9/1965 | Jasinski | 524/558 |
| 3,245,932 | 4/1966 | Glavis et al. | 524/558 |
| 3,669,691 | 1/1970 | De Long et al. | 524/558 |
| 3,894,980 | 7/1975 | De Tommaso | 524/558 |
| 3,970,633 | 7/1976 | Miller et al. | 524/558 |
| 4,085,260 | 4/1978 | Labana et al. | 526/320 |
| 4,167,502 | 9/1979 | Lewis et al. | 526/317 |
| 4,170,582 | 10/1979 | Mori et al. | 526/320 |
| 4,173,669 | 11/1979 | Ashida et al. | 526/317 |
| 4,196,190 | 4/1980 | Gehman et al. | 526/320 |
| 4,226,754 | 10/1980 | Yun et al. | 526/317 |

FOREIGN PATENT DOCUMENTS 2507842 9/1976 Fed. Rep. of Germany ...... 524/558

*Primary Examiner*—Joseph L. Schofer
*Assistant Examiner*—N. Sarofin
*Attorney, Agent, or Firm*—Marc S. Adler

[57] ABSTRACT

Carboxylic acid/hydroxyalkyl ester copolymers of about 100,000–500,000 molecular weight are solubilized and stabilized to render the aqueous solutions thereof resistant to gelation while maintaining the viscosity of the solutions at manageable levels, by partially neutralizing the copolymers. Typical copolymers contain (a) acrylic or methacrylic acid and (b) hydroxyethyl or hydroxypropyl acrylate or methacrylate, in a monomer weight ratio (a:b) of 95:5 to 50:50, and are neutralized 25–75%. The copolymers are useful as viscose dope modifiers in the production of high fluid holding rayon alloy fibers.

17 Claims, No Drawings

STABILIZED POLYMER COMPOSITIONS

This is a continuation of application Ser. No. 218,909, filed Dec. 22, 1980, now abandoned.

BACKGROUND OF THE INVENTION

This invention relates to stabilized polymer compositions including aqueous concentrates, and to a method of stabilizing acid monomer-containing copolymers against gelation.

This application is related to a simultaneously filed application of Frederick Ray Smith, Walter Weiyoung Toy and David Witiak entitled "Alloy Rayon Fibers", Ser. No. 219,134 abandoned.

A variety of hydrophilic polymers has been developed for incorporation into regenerated cellulose to increase the fluid absorbency of the rayon fibers produced therefrom. The rayon fibers incorporating the hydrophilic polymers are commonly referred to as "alloy rayon fibers." Typically, the alloy rayon is produced by adding the hydrophilic polymer to the viscose solution, at any stage of viscose aging, and then spinning or extruding the viscose solution containing the polymer into an acid bath wherein the cellulose fiber is regenerated. The hydrophilic polymer should be in salt form for complete solubility in the viscose solution and in order to provide high absorbency in the alloy rayon. While the viscose is highly caustic and therefore inherently will neutralize the hydrophilic polymer, it is common practice to pre-neutralize the hydrophilic polymer before addition to the viscose dope. However, the hydrophilic polymer alloyed with the rayon as the result of admixture with the viscose and regeneration in the spin bath, is converted to the free acid form due to the highly acidic character of the spin bath. Post-neutralization of the alloy fibers can be a discrete step but more usually it is combined with other steps during finishing of the alloy rayon to a commercial product.

Representative patents which describe the use of polymers for increasing the fluid-holding capacity of rayon fibers are U.S. Pat. No. Re. 30,029 and U.S. Pat. Nos. 4,066,584, 4,104,214 and 4,199,367.

Recently, a new class of hydrophilic polymers has been developed, specifically for use in producing alloy rayon having enhanced fluid-holding capacity. The use of these polymers in alloy rayon is described and covered in copending application Ser. No. 219,134 abandoned referred to above. Among the hydrophilic polymers described therein are copolymers of acrylic acid or methacrylic acid and hydroxyalkyl ($C_2$-$C_6$) esters of such acids. Typical of these copolymers are the following: acrylic acid/hydroxyethyl methacrylate, acrylic acid/hydroxyethyl acrylate, acrylic acid/hydroxypropyl methacrylate, acrylic acid/hydroxypropyl acrylate, and the corresponding copolymers wherein methacrylic acid is substituted for all or part of the acrylic acid.

These hydrophilic polymers have the unique property of being sufficiently hydrophobic under the highly acidic and high electrolyte conditions of the spinning bath into which rayon viscose is spun, such that most, if not all, of the polymer incorporated into the viscose prior to the spinning step remains in the fiber, thereby minimizing the amount of non-alloyed and extractable polymer carried over into the spin bath. This is significant because it has been found that non-alloyed and extractable polymer carried over tends to accumulate and eventually form sticky precipitates. These precipitates will contaminate the rayon spinning lines and even the spinnerettes, and thereby reducing the efficiency of the alloy fiber production and requiring expensive modifications of the production process and equipment.

Although the hydrophilic copolymers of the copending application are highly effective for increasing fluid absorbency of the alloy rayon made therefrom while also minimizing precipitation of non-alloyed polymer in the spinning bath, it has been found difficult to control the viscosity of the polymers prior to blending with the viscose dope. Even the conventional step of pre-neutralization of the polymers prior to admixture with the viscose has not been fully effective and in fact has tended to unduly increase the viscosity of the polymer concentrate solution (or of the viscose dope if the polymer is added directly to the dope without pre-neutralization) with the result that the polymer concentrate and the viscose dope containing the concentrate cannot be efficiently pumped or otherwise handled during the alloy rayon production process. Accordingly, due to the tendency of the hydrophilic copolymer to rapidly increase in viscosity prior to pre-neutralization and admixture with the viscose dope, the benefits of the polymer for increasing fluid-holding capacity while avoiding loss and precipitation in the spin bath are substantially reduced.

Polymers based on hydroxyalkyl esters of carboxylic acids are known for a variety of uses other than in rayon alloy fibers. However, the prior art, such as the following patents, does not provide sufficient guidance with respect to monomer selected and ratios, molecular weight, degree of neutralization and other properties, to enable the polymers to be used effectively as alloying components of rayon fiber.

U.S. Pat. No. 3,311,583 to Bearden describes terpolymers of acrylic or methacrylic acid (10-40 wt.%), alkyl ($C_1$-$C_8$) esters thereof (10-65 wt.%) and hydroxyalkyl ($C_2$-$C_4$) esters thereof (15-70 wt.%) in coating compositions which are converted into insoluble polymeric materials upon heating. Example 3 of the patent describes a polymer solution neutralized by an amount of ammonium hydroxide equivalent to 30% of the acidity. U.S. Pat. No. 3,424,638 to Marans describes acrylic acid/ 2-hydroxyethyl methacrylate blends (80/20 to 20/80) which are polymerized in bulk by ionizing irradiation, thus causing the material to bond to a substrate on which it is placed. U.S. Pat. No. 3,567,118 to Shepherd et al describes the entrapping of essences in a fibrous material by treating the fibrous material with a coating of a hydrophilic copolymer including copolymers of 2-hydroxyethyl acrylate or methacrylate and 0.1-15% of an acid monomer such as acrylic or methacrylic acid. U.S. Pat. No. 3,669,103 to Harper et al describes lightly crosslinked homopolymers of 2-hydroxyethyl acrylate, and alkali metal salts thereof, for application to a flexible support such as a diaper material. U.S. Pat. No. 4,029,577 to Godlewski et al describes water-soluble polymers, including fully neutralized forms thereof, of acrylic acid and a hydroxy lower alkyl acrylate (mole ratio 34:1 to 1:4), for use in controlling the deposition of scale deposits in water processing systems such as steam generators and cooling water systems. U.S. Pat. No. 4,190,562 to Westerman teaches water absorbent films of acrylic or methacrylic acid copolymers crosslinked with hydroxyethyl methacrylate or hydroxypropyl methacrylate. U.S. Pat. No. 4,196,190 to Gehman et al describes water insoluble tetrapolymers based on alkyl acrylate, methylmethacrylate, hydroxyethyl methacrylate and methacrylic acid for use in hair-setting or holding resins.

SUMMARY OF THE INVENTION

This invention is based on the discovery that by partially neutralizing acid/hydroxyalkyl ester copolymers as, or shortly after, the copolymers are synthesized, the copolymers in aqueous concentrate form are stabilized, that is, the polymer concentrates remain pourable for several weeks or even months. In contrast, unneutralized solutions of the copolymers rapidly increase in viscosity soon after synthesis, and after a few days or weeks form non-pourable gelatinous masses. It is believed that the rapid increase in viscosity and ultimate gel formation is due to spontaneous crosslinking between the carboxylic acid and hydroxyalkyl groups of the unneutralized copolymers, and that neutralization inhibits the crosslinking reaction. Moreover, for the molecular weight ranges and viscosities preferred for more efficient incorporation of the copolymers into rayon alloy fibers, complete neutralization is undesirable.

DETAILED DESCRIPTION

The polymer compositions of the invention comprise copolymers of (a) an alpha, beta-monoethylenically unsaturated monocarboxylic acid, and (b) a hydroxyalkyl ester of such acid, wherein the alkyl group contains 2 to 6 carbon atoms, in a monomer ratio (a:b) ranging from 95:5 to 50:50 by weight. Typical monocarboxylic acid monomers are acrylic acid, methacrylic acid, butenoic acid and 2-methylbutenoic acid. Acrylic acid is preferred and can be the only acid monomer or can be used in admixture with one or more of methacrylic acid and homologs thereof. Useful ester monomers include hydroxyethyl methacrylate, hydroxyethyl acrylate, hydroxypropyl acrylate, hydroxypropyl methacrylate, and the hydroxyalkyl ($C_2$–$C_6$) esters of butenoic acid and methylbutenoic acid. Preferred hydroxyalkyl esters are hydroxyethyl methacrylate, hydroxyethyl acrylate, hydroxypropyl methacrylate, and hydroxypropyl acrylate, including mixtures of two or more thereof. For ester monomers in which the ester group is propyl or higher, the hydroxyl group is attached to the terminal carbon atom or to a carbon atom intermediate the terminal carbon atom and the alpha carbon atom. More usually, the ester monomers are a mixture of isomers wherein the hydroxyl group of a portion of the ester monomers is bonded to the terminal carbon atom and in the remaining ester monomers is bonded to intermediate carbon atoms, e.g., mixtures containing 3-hydroxypropyl methacrylate and 2-hydroxypropyl methacrylate.

The copolymers may contain minor proportions, e.g., up to about 25 wt.%, of other monomers in addition to monomers (a) and (b) provided the types and amount are such as not to detract materially from the useful properties of the polymers and polymer solutions. Appropriate optional monomers include any monomers which are monofunctional to monomers (a) and (b) and therefore will not introduce crosslinking. Among acceptable other monomers are acrylic and methacrylic esters, such as the $C_1$–$C_{18}$ alkyl esters thereof, styrene, alkyl ($C_1$–$C_8$) substituted styrenes, vinyl esters such as vinyl acetate, and vinyl halides such as vinyl chloride, and the like.

The copolymers have molecular weights (weight average) in the range of about 100,000 to about 500,000, preferably about 300,000 to about 400,000. Molecular weights substantially under 100,000 will not provide sufficient fluid-holding capacity and molecular weights over 500,000 render the copolymer solutions too viscous for efficient handling and incorporation into the viscose.

The viscosity of solutions of the polymers, as well as resistance of the copolymers to crosslinking and gelation, is also related to the extent to which the copolymers are neutralized. Moreover, neutralization will solubilize those copolymers which are marginally water-soluble when synthesized. Generally, it has been found that at least about 25% of the copolymer should be neutralized, that is, at least about 25% of the carboxyl groups of the copolymer should be converted to salt form. While copolymers at or near the lower limit of molecular weight may be completely neutralized, complete neutralization of higher molecular weight copolymers would render such copolymers too viscous for most industrial applications. Accordingly, neutralization to the extent of about 25–75%, more preferably about 30–50% (particularly in the case of copolymers of higher molecular weight, e.g., about 300,000 to 400,000), provides best results.

The copolymers are further characterized in that aqueous solutions containing 5 to 20 weight % of the neutralized copolymer are resistant to gelation and exhibit a Brookfield viscosity of not greater than 20,000 cps measured at 20° C.±2° C. using spindle No. 3 at 3 rpm. Preferably, the upper limit of viscosity is about 10,000 cps, for optimum ease of handling when the copolymers are to be blended into viscose for the spinning of alloy rayon therefrom.

Preferred copolymers have monomer ratios ranging from 90:10 to 60:40. Typical of these copolymers are the following: acrylic acid/hydroxyethyl methacrylate (80/20 to 70/30) acrylic acid/hydroxyethyl acrylate (80/20) and acrylic acid/hydroxypropyl methacrylate (80/20 to 90/10).

The copolymers of the invention are synthesized by techniques well-known in the art (for example, by solution polymerization, using a peroxy catalyst) to provide aqueous dispersions containing about 10–20% by weight of the polymer. See, for example, C. E. Schildknecht, ed., "Polymer Processes," Vol X of *High Polymers*, Interscience Publishers (1956), pages 175-194. Since cross-linking will begin as soon as the polymers are synthesized, it is preferred to stabilize the polymers upon synthesis. Any alkaline material known to neutralize carboxylic acid groups of polymers but without introducing cross-linking may be used. Typical useful neutralizing agents are monovalent metal hydroxides such as sodium hydroxide and potassium hydroxide; carbonates such as sodium carbonate and bicarbonate; silicates such as sodium silicate; ammonium hydroxide; and organic amines such as triethylamine and diethanolamine. Sodium hydroxide and ammonium hydroxide are preferred.

After neutralization the polymer solutions may be stored for extended periods of time or shipped to a point of use, without undergoing gelation. Alternatively, the neutralized solutions may be reduced to a dry form (as by drum drying) and stored or shipped as desired and redissolved.

Use of the neutralized copolymers in producing alloy rayon is described in copending application Ser. No. 219,134 abandoned referred to above. The alloy rayon fibers may be used in a variety of high fluid-holding forms, such as tampons, bandages, diapers, surgical dressings and sportswear.

The following examples will serve to further illustrate the invention but without intent to limit the scope thereof except as set forth in the appended claims. All parts and percentages are by weight unless otherwise indicated.

EXAMPLE 1

Preparation of acrylic acid/hydroxyethyl methacrylate; (80/20 wt.) copolymer.

Into a 5 liter 3-neck round bottom flask is charged 2960 ml of deionized (DI) water. The water is heated with a heating mantle to 85°-87° C. while being stirred with a mechanical stirrer. While this is being done, 416 g of acrylic acid (AA) and 104 g of 2-hydroxyethyl methacrylate (HEMA) are charged into a one-liter graduated separatory funnel. A 1 wt.% aqueous solution of ammonium persulfate (APS) is also prepared. When the temperature of the water levels off at 85°-87° C., 13 ml of the 1 wt.% APS solution is added to the reactor. The monomer solution and a co-feed catalyst of 52 ml of the 1 wt.% APS solution are then added gradually and proportionally to the reactor over a period of about two hours. During the addition the temperature is maintained at 85°-87° C. and agitation is increased gradually to maintain good stirring. After the additions are completed the polymer solution is held at 85°-87° C. for 30 minutes. At the end of the 30 minute time period an additional catalyst system consisting of 0.4 g of tertiary butyl hydroperoxide diluted in 10 ml of DI water and 0.3 g of sodium sulfoxylate formaldehyde dissolved in 10 ml of DI water are added. Stirring is continued for 30 minutes. A neutralizer consisting of 232 g of 50% sodium hydroxide is added. Stirring is continued for about 30 minutes. The product obtained is a clear solution with a viscosity of about 7000 cps (Brookfield Viscometer, 12 rpm, spindle 3, 20° C.±2° C.) and has a polymer solids content of 15.4% with about 50% of the acid groups neutralized.

EXAMPLES 2-8

Essentially as described in Example 1, aqueous solutions were prepared containing about 15% polymer solids of the following copolymers (Table I). In each case the copolymers were 50% neutralized in solution by the addition of the requisite amounts of a 50% sodium hydroxide solution. The polymer solutions exhibited a Brookfield viscosity of about 7000 cps, measured at 20° C.±2° C., using spindle No. 3 at 12 rpm.

TABLE I

| Example | Monomers | Monomer wt ratio (%) |
|---|---|---|
| 2 | acrylic acid/hydroxyethyl methacrylate | 70/30 |
| 3 | acrylic acid/hydroxypropyl methacrylate | 80/20 |
| 4 | acrylic acid/hydroxypropyl methacrylate | 90/10 |
| 5 | acrylic acid/hydroxyethyl acrylate | 80/20 |
| 6 | methacrylic acid/hydroxyethyl methacrylate | 80/20 |
| 7 | methacrylic acid/hydroxypropyl methacrylate | 80/20 |
| 8 | acrylic acid/hydroxypropyl acrylate | 80/20 |

EXAMPLE 9

This example illustrates the effect of polymer solids and degree of neutralization upon solution viscosity and stability (resistance to gellation) of aqueous copolymer solutions of the invention. The objective was to determine the degree of neutralization required to stabilize the polymers for given periods while minimizing increase in solution viscosity. The copolymers were prepared essentially as described in Example 1 except that neutralization was carried out to various levels on different samples of the same copolymer. The samples were neutralized to the levels indicated, stored at 55° C. for various intervals, and the samples were cooled to 20° C.±2° C. before measuring solution viscosities (Brookfield, spindle 3, 3 rpm, 20° C.±2° C.).

The data (Tables II-VII) shows that the polymer solutions have an optimum combination of viscosity and stability when neutralized to about 50%. In many cases (Tables II-V and VII) good stability is also evident at 25% neutralization provided the polymer solids are kept relatively low (about 10%).

TABLE II

| Copolymer Solution A: | Acrylic acid/hydroxyethyl methacrylate (80/20), 10% polymer solids | | | | |
|---|---|---|---|---|---|
| Neutralization (%) | 0 | 25 | 50 | 75 | 100 |
| Solution pH | 2.2 | 4.3 | 5.1 | 5.9 | 12 |
| Time (Days) | Viscosity (cps) | | | | |
| 0 | 75 | 325 | 1050 | 1700 | 3500 |
| 3 | 530 | 400 | 1050 | 1650 | 3050 |
| 7 | 800 | 500 | 1050 | 1700 | 3000 |
| 14 | Gelled | 700 | 1050 | 1800 | 3150 |
| 24 | Gelled | 950 | 1100 | 1800 | 3150 |
| 33 | Gelled | 1050 | 1200 | 1750 | 2900 |

TABLE III

| Copolymer Solution B: | Acrylic acid/hydroxyethyl methacrylate (70/30), 9.3% polymer solids | | | | |
|---|---|---|---|---|---|
| Neutralization (%) | 0 | 25 | 50 | 75 | 100 |
| Solution pH | 2.3 | 4.2 | 5.0 | 5.9 | 11.4 |
| Time (Days) | Viscosity (cps) | | | | |
| 0 | 75 | 125 | 150 | 500 | 950 |
| 3 | 70 | 120 | 350 | 350 | 750 |
| 7 | 175 | 75 | 125 | 550 | 800 |
| 14 | 81,000 | 200 | 175 | 375 | 850 |
| 24 | Gelled | 100 | 150 | 600 | 800 |
| 33 | Gelled | 125 | 200 | 400 | 850 |

TABLE IV

| Copolymer Solution C: | Acrylic acid/hydroxypropyl methacrylate (80/20), 12.5% polymer solids | | | | |
|---|---|---|---|---|---|
| Neutralization (%) | 0 | 25 | 50 | 75 | 100 |
| Solution pH | 2.6 | 4.6 | 5.1 | 5.8 | 7.0 |
| Time (Days) | Viscosity (cps) | | | | |
| 0 | 225 | 850 | 1750 | 2750 | 6300 |
| 3 | 290 | 800 | 1500 | 2550 | 4750 |
| 7 | 750 | 1100 | 1550 | 2700 | 4800 |
| 14 | 975 | 800 | 1700 | 2600 | 2600 |
| 24 | 2300 | 1300 | 1700 | 2800 | 4300 |
| 33 | Gelled | 1550 | 1750 | 2800 | 5000 |

TABLE V

| Copolymer Solution D: | Acrylic acid/hydroxypropyl methacrylate (90/10), 11.1% polymer solids | | | | |
|---|---|---|---|---|---|
| Neutralization (%) | 0 | 25 | 50 | 75 | 100 |
| Solution pH | 2.5 | 4.4 | 5.2 | 6.2 | 7.2 |
| Time (Days) | Viscosity (cps) | | | | |
| 0 | 350 | 1050 | 2050 | 3600 | 7900 |
| 3 | 350 | 850 | 1850 | 3200 | 7200 |
| 7 | 575 | 1100 | 1850 | 3250 | 6600 |
| 14 | 650 | 1050 | 2100 | 3250 | 5800 |
| 24 | 1600 | 1300 | 2100 | 3500 | 6600 |
| 33 | 2650 | 1500 | 2300 | 3250 | 6800 |

TABLE VI

| Copolymer Solution E: | Acrylic acid/hydroxyethyl acrylate (80/20), 12.5% polymer solids | | | | |
|---|---|---|---|---|---|
| Neutralization (%) | 0 | 25 | 50 | 75 | 100 |
| Solution pH | 2.2 | 4.2 | 5.0 | 5.7 | 6.8 |
| Time (Days) | Viscosity (cps) | | | | |
| 0 | 775 | 1800 | 3500 | 7600 | 12200 |
| 3 | Gelled | 2300 | 3150 | 6600 | 11400 |
| 7 | Gelled | 3250 | 3500 | 3500 | 11200 |
| 14 | Gelled | 6400 | 4400 | 6500 | 12200 |
| 24 | Gelled | Gelled | 5000 | 7200 | 11000 |
| 33 | Gelled | Gelled | 5500 | 6800 | 11800 |

Table VII shows relationship of viscosity to polymer solids content of the solutions: as polymer solids increases, the viscosities also increase. In some cases, higher solids can also cause instability since viscosity then increases at a faster rate (compare the unneutralized solutions with 25% neutralized solutions). From the standpoint of the economics of production and shipping, polymer solids should be as high as possible. However, since high polymer solids introduces higher viscosities, the solutions may become difficult to pump or otherwise managed by the user. Hence, when shipped and used as polymer solutions, polymer solids are best kept at about 10–15% and the polymers should be neutralized no more than about 75%, preferably about 50%.

TABLE VII

| Copolymer Solution F: Acrylic acid/hydroxyethyl methacrylate (80/20), 10% and 13% polymer solids | | | | | | | | | | |
|---|---|---|---|---|---|---|---|---|---|---|
| Neutralization (%) | 0 | | 25 | | 50 | | 75 | | 100 | |
| Solution pH | 2.2 | 2.3 | 4.3 | 4.4 | 5.1 | 5.0 | 5.9 | 5.7 | 12.0 | 10.7 |
| | Viscosity (cps) | | | | | | | | | |
| Time | Polymer Solids (%) | | Polymer Solids (%) | | Polymer Solids (%) | | Polymer Solids (%) | | Polymer Solids (%) | |
| (Days) | 10 | 13 | 10 | 13 | 10 | 13 | 10 | 13 | 10 | 13 |
| 0 | 75 | 1900 | 325 | 2900 | 1050 | 6400 | 1700 | 9400 | 3500 | 16600 |
| 3 | 530 | Gelled | 400 | 4100 | 1050 | 5900 | 1650 | 8400 | 3050 | 14800 |
| 7 | 800 | Gelled | 500 | 8000 | 1050 | 5600 | 1700 | 6700 | 3000 | 13400 |
| 14 | Gelled | Gelled | 700 | Gelled | 1050 | 6600 | 1800 | 7200 | 3150 | 14100 |

I claim:

1. A polymer composition comprising a copolymer of
   (a) an alpha, beta-monoethylenically unsaturated monocarboxylic acid, and
   (b) a hydroxy alkyl ($C_2$-$C_6$) ester of an alpha, beta-monoethylenically unsaturated monocarboxylic acid, said copolymer characterized by a monomer ratio (a:b) ranging from 95:5 to 50:50; a weight average molecular weight of about 100,000–500,000, partial neutralization to an extent of at least 25%, and wherein aqueous solutions containing 5–20 weight % of the neutralized copolymer exhibit resistance to gelation while producing a Brookfield viscosity of not greater than 20,000 cps measured at 20° C.±2° C. using spindle No. 3 at 3 rpm.

2. The polymer composition of claim 1 wherein monomer (a) is at least one of acrylic acid and methacrylic acid.

3. The polymer composition of claim 1 wherein monomer (b) is at least one of hydroxyethyl acrylate, hydroxyethyl methacrylate, hydroxypropyl acrylate and hydroxypropyl methacrylate.

4. The polymer composition of claim 1 wherein monomer (a) is at least one of acrylic acid and methacrylic acid, and monomer (b) is at least one of hydroxyethyl acrylate, hydroxyethyl methacrylate, hydroxypropyl acrylate and hydroxypropyl methacrylate.

5. The polymer composition of claim 1 wherein the copolymer is a copolymer of (a) acrylic acid and (b) hydroxyethyl methacrylate, in a monomer ratio (a:b) of about 60:40 to 90:10, and the copolymer is neutralized up to about 75%.

6. The polymer composition of claim 1 wherein the copolymer is a copolymer of about (a) acrylic acid and (b) hydroxyethyl acrylate, in a monomer ratio (a:b) of about 60:40 to 90:10, and the copolymer is neutralized up to about 75%.

7. The polymer composition of claim 1 wherein the copolymer is a copolymer of (a) acrylic acid and (b) hydroxypropyl methacrylate, in a monomer ratio (a:b) of about 60:40 to 90:10, and the copolymer is neutralized up to about 75%.

8. The polymer composition of claim 1 wherein the copolymer is a copolymer of (a) acrylic acid and (b) hydroxypropyl acrylate, in a monomer ratio (a:b) of about 60:40 to 90:10, and the copolymer is neutralized up to about 75%.

9. A stabilized polymer concentrate comprising an aqueous solution containing about 5–20 weight % of a copolymer of (a) an alpha, beta-monoethylenically unsaturated monocarboxylic acid, and (b) a hydroxyalkyl ($C_2$-$C_6$) ester of an alpha, beta-monoethylenically unsaturated monocarboxylic acid, in a monomer ratio (a:b) in the range of 95:5 to 50:50, said copolymer having a weight average molecular weight of about 100,000–500,000 and being partially neutralized from about 25% to about 75%, and said concentrate characterized by a Brookfield viscosity of not greater than 20,000 cps measured at 20° C.±2° C. using spindle No. 3 at 3 rpm.

10. The stabilized polymer concentrate of claim 9 wherein monomer (a) of the copolymer is at least one of acrylic acid and methacrylic acid, and monomer (b) is at least one of hydroxyethyl acrylate, hydroxyethyl methacrylate, hydroxypropyl acrylate and hydroxypropyl methacrylate.

11. The stabilized polymer concentrate of claim 9 wherein the copolymer is a copolymer of (a) acrylic acid and (b) hydroxyethyl methacrylate, in a monomer ration of (a:b) of about 60:40 to 90:10, and the copolymer is neutralized up to about 75%.

12. The stabilized polymer concentrate of claim 9 wherein the copolymer is a copolymer of (a) acrylic acid and (b) hydroxyethyl acrylate, in a monomer ratio of (a:b) of about 60:40 to 90:10, and the copolymer is neutralized up to about 75%.

13. The stabilized polymer concentrate of claim 9 wherein the copolymer is a copolymer of (a) acrylic acid and (b) hydroxypropyl methacrylate, in a monomer ration of (a:b) of about 60:40 to 90:10, and the copolymer is neutralized up to about 75%.

14. The stabilized polymer concentrate of claim 9 wherein the copolymer is a copolymer of (a) acrylic acid and (b) hydroxypropyl acrylate, in a monomer ratio of (a:b) of about 60:40 to 90:10, and the copolymer is neutralized up to about 75%.

15. The stabilized polymer concentrate of claim 9 wherein the aqueous solution contains about 10–15 weight % of the copolymer.

16. A method of stabilizing a polymer composition comprising an aqueous solution of a copolymer of (a) an alpha, beta-monoethylenically unsaturated monocarboxylic acid, and (b) a hydroxyalkyl ($C_2$–$C_6$) ester of an alpha, beta-monoethylenically unsaturated monocarboxylic acid, in a monomer ratio of (a:b) of about 95:5 to 50:50, said copolymer having a weight average molecular weight of about 100,000–500,000, comprising the steps of forming an aqueous dispersion containing 5–20 weight % of said copolymer and adding a neutralizing agent to the dispersion in an amount effective to partially neutralize from about 25% to about 75% of the copolymer, the partially neutralized copolymer being rendered resistant to gelation, and the copolymer solution exhibits a Brookfield viscosity of not greater than 20,000 cps measured at 20° C.±2° C. using spindle No. 2 at 3 rpm.

17. The method of claim 16 wherein the copolymer is a copolymer of (a) at least one of acrylic acid and methacrylic acid, and (b) at least one of hydroxyethyl acrylate, hydroxyethyl methacrylate, hydroxypropyl acrylate, and hydroxypropyl methacrylate.

* * * * *